(12) United States Patent
Bauer

(10) Patent No.: US 7,048,845 B2
(45) Date of Patent: May 23, 2006

(54) MIDDLE DISTILLATE SELECTIVE HYDROCRACKING PROCESS

(75) Inventor: Lorenz J. Bauer, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 469 days.

(21) Appl. No.: 10/045,395

(22) Filed: Nov. 7, 2001

(65) Prior Publication Data

US 2004/0045871 A1 Mar. 11, 2004

(51) Int. Cl.
*C10G 47/16* (2006.01)
*C10G 47/20* (2006.01)

(52) U.S. Cl. ............... 208/111.01; 208/108; 208/111.3; 208/111.35

(58) Field of Classification Search ............... 208/108, 208/111.01, 111.3, 111.35
See application file for complete search history.

(56) References Cited

U.S. PATENT DOCUMENTS

| | | | |
|---|---|---|---|
| 3,923,641 A | 12/1975 | Morrison | 208/111 |
| 4,612,108 A | 9/1986 | Angevine et al. | 208/111 |
| 4,757,041 A | 7/1988 | Oleck et al. | 502/65 |
| 4,820,402 A | 4/1989 | Partridge et al. | 208/111 |
| 4,911,823 A | 3/1990 | Chen et al. | 208/67 |
| 4,983,273 A | 1/1991 | Kennedy et al. | 208/89 |
| 5,128,024 A | 7/1992 | LaPierre et al. | 208/89 |
| 5,228,979 A | 7/1993 | Ward | 208/111 |
| 5,284,573 A | 2/1994 | LaPierre et al. | 208/89 |
| 5,294,573 A | 3/1994 | Haun | 501/12 |
| 5,384,296 A | 1/1995 | Tsao | 502/66 |
| 5,609,752 A * | 3/1997 | Del Rossi et al. | 208/144 |
| 5,833,840 A | 11/1998 | Absil et al. | 208/120 |
| 5,866,744 A | 2/1999 | Wu et al. | 585/486 |
| 6,190,538 B1 | 2/2001 | Gosselink et al. | 208/111.01 |
| 6,231,750 B1 | 5/2001 | Kasztelan et al. | 208/111.01 |
| 2002/0094931 A1 * | 7/2002 | Wang et al. | 502/63 |

FOREIGN PATENT DOCUMENTS

| | | |
|---|---|---|
| EP | 0 955 093 A1 | 11/1999 |
| JP | 11-156198 | 6/1999 |

OTHER PUBLICATIONS

Database WPI Section Ch, Week 200001 Derwent Publications Ltd., London, GB; Class H06, An 1999–348058 XP002237545 & JP 11 156198 A (China Petrochemical Corp), Jun. 15, 1999 abstract.

* cited by examiner

*Primary Examiner*—Walter D. Griffin
(74) *Attorney, Agent, or Firm*—John G. Tolomei; James C. Paschall; Michael A. Moore

(57) ABSTRACT

Increased yields of middle distillate products are obtained in a hydrocracking process by the use of a catalyst containing a Beta zeolite which has been hydrothermally treated to adjust the distribution of relatively weak and strong acid sites. The number of strong acid sites is reduced, preferably by steaming at a temperature above 750° C. for at least one hour, with the acidity distribution being measured by pyridine IR adsorption values taken at 150° C., and 300° C., and 450° C.

15 Claims, 8 Drawing Sheets

MIDDLE DISTILLATE SELECTIVE HYDROCRACKING PROCESS

FIELD OF THE INVENTION

The invention relates to a hydrocarbon conversion process referred to in the art as hydrocracking. The invention specifically relates to a hydrocracking process which produces increased quantities of middle distillate boiling range products. The invention more specifically relates to a hydrocracking process which employs a catalyst comprising a Beta zeolite as an active cracking component.

BACKGROUND OF THE INVENTION

Hydrocracking is a basic conversion process used in many petroleum refineries worldwide to reduce the molecular weight of petroleum derived feedstocks and convert the feedstock into more valuable products such as motor fuel, diesel fuel and lubricants. Hydrocracking also has other beneficial results such as removing sulfur and nitrogen from the feedstock by hydrodesulfurization. While the overall physical design of a hydrocracking process can be very important to the level of conversion and selectivity achieved by a hydrocracking process, these two measures of performance are always also tied to the abilities of the hydrocracking catalyst employed in the process.

Hydrocracking catalysts are subject to initial classification on the basis of the nature of the predominant cracking component of the catalyst. This classification divides hydrocracking catalysts into those based upon an amorphous cracking component such as silica-alumina and those based upon a zeolite cracking component such as Y zeolite. Hydrocracking catalysts are also subject to classification on the basis of their intended predominant product of which the two main products are naphtha and "distillate", a term which in the hydrocracking refining art refers to distillable petroleum derived fractions having a boiling point range which is above that of naphtha. Distillate typically includes the products recovered at a refinery as kerosene and diesel fuel. The subject invention relates to a zeolite catalyst having improved selectivity for the production of distillate boiling range hydrocarbons. These catalysts normally comprise a zeolite component and a binder or other component such as alumina or silica-alumina and a metal hydrogenation component.

RELATED ART

Zeolite beta has been proposed as a component of several different catalysts including catalysts for hydrocracking and hydrodewaxing. For instance, U.S. Pat. No. 3,923,641 issued to R. A. Morrison describes hydrocracking $C_5+$ and $C_7+$ naphthas to produce a high isobutane-normal butane ratio product using zeolite beta.

U.S. Pat. No. 4,612,108 issued to P. J. Angevine et al. describes a hydrocracking process which employs a catalyst comprising a beta zeolite. The catalyst is described as being effective in dewaxing of an unconverted portion of the charge stock and in partial conversion of the charge stock.

U.S. Pat. No. 4,757,041 issued to S. M. Oleck et al describes the simultaneous hydrocracking and dewaxing of heavy oils using a catalyst comprising zeolite beta plus a second zeolite such as X or Y zeolite.

U.S. Pat. No. 4,820,402 issued to R. D. Partridge et al. presents a hydrocracking process described as providing selectivity for the production of middle distillate range products. This increased selectivity is attributed to the use of a catalyst containing a highly siliceous large pore zeolite as the acidic component of a catalyst. Zeolite beta is indicated as being a suitable zeolite for this catalyst when it has a silica:alumina ratio of at least 50:1.

U.S. Pat. No. 4,983,273 issued to C. R. Kennedy et al. describes a hydrocracking process employing a catalyst based on zeolite beta. The process as presenting several improvements due to unique process flows which include partial recycle of the liquid products. The beta zeolite preferably has a silica:alumina ratio greater than 30:1.

U.S. Pat. No. 5,228,979 describes a process for hydrocracking of hydrocarbon feedstocks in an ammonia rich environment using a catalyst comprising zeolite beta and a noble metal hydrogenation component, preferably palladium. This reference describes the silica:alumina ratio of the beta zeolite as being between 10 and 100 and preferably less than 40. There is also set out preferred water and cyclohexane adsorption capacities for the beta zeolite. These characteristics of the zeolite are described as providing a high activity hydrocracking catalyst.

U.S. Pat Nos. 5,128,024 and 5,284.573 issued to R. B. LaPierre et al. describe hydrocarbon conversion processes in which heavy oils are simultaneously subjected to hydrocracking and dewaxing using a catalyst based upon zeolite beta with a hydrogenation component.

U.S. Pat. No. 6,190,538 B1 issued to J. W. Gosselink et al. describes the preparation of a catalyst which comprises zeolite beta as a first of two cracking components. The preferred beta is described as employed in the form of a small crystal having a silica:alumina ratio greater than 20 and preferably greater than 25 as for instance 120–150.

U.S. Pat. No. 6,231,750 B1 issued to S. Kasztelan et al. presents a hydrocracking catalyst comprising a matrix, a beta zeolite, a Group VB element and at least one mixed sulfide phase. The beta zeolite preferably has a silicon to alumina ratio of from 10 to 200 and more preferably of 10 to 150. It is indicated the beta zeolite can be dealuminated and should have a surface area greater than 400 square meters per gram.

Finally, Japanese unexamined patent publication published Jun. 15, 1999 based upon application 11-156198 describes a hydrocracking process for the production of middle distillates which employs a catalyst comprising beta zeolite and silica-alumina. The beta zeolite is dealuminated by acid treatment and then hydrothermally treated. The treated beta zeolite is characterized in terms of its total acidity, measured by pyridine adsorption, and adsorption capacity for water.

SUMMARY OF THE INVENTION

It has been discovered that the selectivity of a middle distillate hydrocracking catalyst containing beta zeolite can be increased by steaming the zeolite under conditions which reduce its acidity, as measured for instance by pyridine adsorption, to certain low values. The physical changes in the acidity of the zeolite and its selectivity correlate with the percent of tetrahedral zeolite in the zeolite structure. It has also been discovered that the improved selectivity of beta zeolite hydrocracking catalysts can be correlated with a reduction in tetrahedral aluminum in the zeolites framework as determined by NMR and by the zeolites adsorption capacity for sulfur hexafluoride.

It is believed that a hydrocracking catalyst containing the subject treated beta zeolite is novel to the art.

The invention can be summarized as a hydrocracking process which comprises contacting a feed stream comprising hydrocarbons having boiling points between about 340° C. and about 540° C. with a catalyst comprising a hydrogenation component and beta zeolite, which beta zeolite has been treated by steaming at temperatures above 750° C. to increase its selectivity to the production of middle distillate products and which beta zeolite is further characterized by a unit cell size parameter "c" value of 26.10 to 26.20 and a positive amount less than 17 percent of total aluminum as tetrahedral aluminum as determined by NMR.

DETAILED DESCRIPTION

Figure 1:
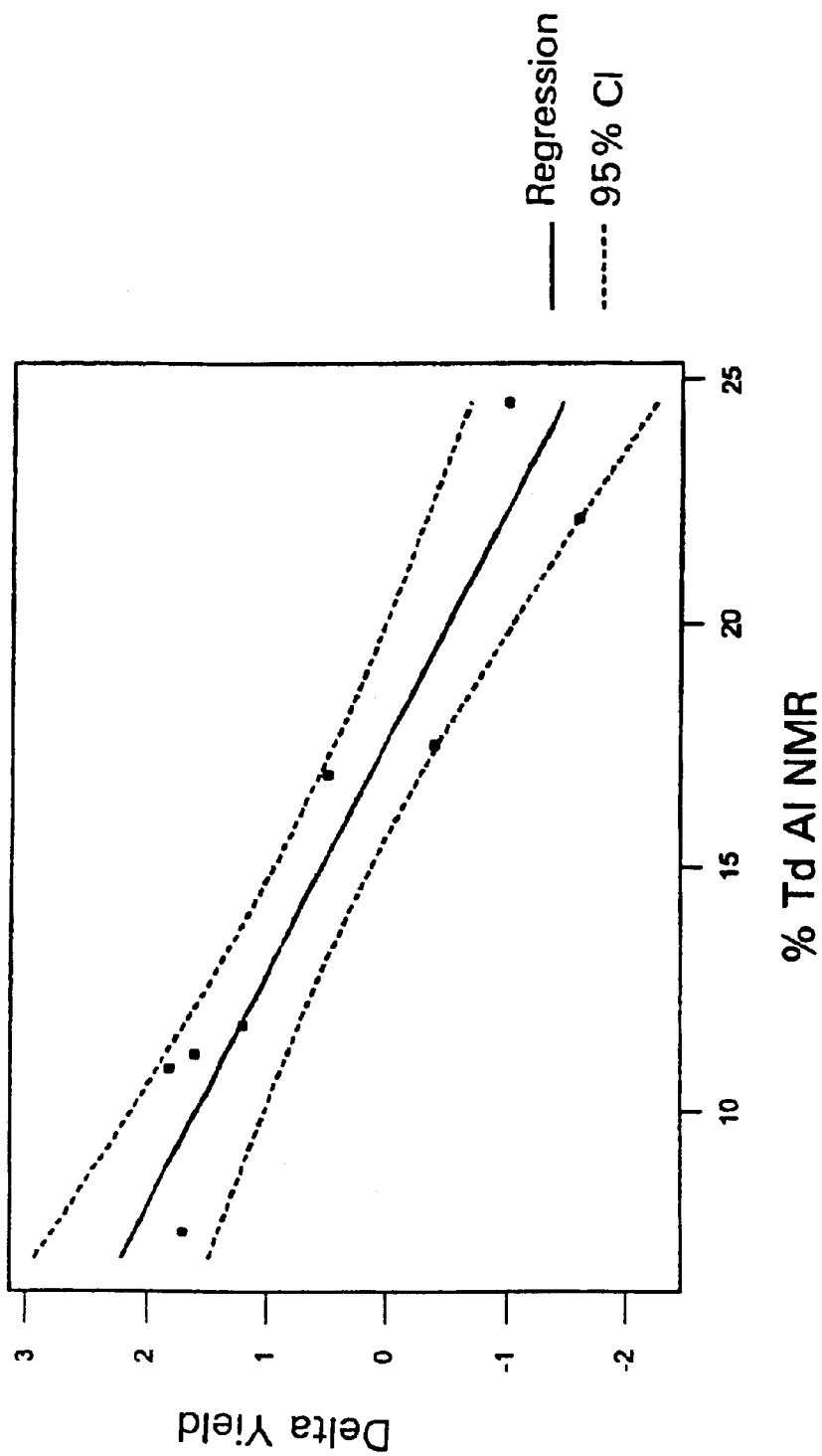
FIG. 1 is a chart of the yield advantage of tested catalysts compared to a reference catalyst plotted versus percent total tetrahedral (Td) aluminum in the zeolite used in the catalysts as measured by NMR.

The relative value of the different products of a petroleum refinery are set by a variety of factors including local consumption patterns, and climate. In some locations there is a great economic advantage to producing naphtha boiling range hydrocarbons. In other locations there is a preference for producing the heavier (higher boiling) diesel and kerosene fractions. While the product distribution from an existing hydrocracking unit can be adjust to a limited extent by changes in feed stock and operation conditions, the yield characteristics of the catalyst used in the process is often of high if not determining importance. As the relative demand for distillate is increasing in many areas faster than the demand for naphtha boiling hydrocarbons, many refineries are attempting to increase their distillate production.

In addition it is very important to refinery economics to avoid over conversion of the feedstock. Such non selective cracking results in the production of larger percentages of undesired, lower value products such as $C_3$ and $C_4$ hydrocarbons. Thus the selectivity of the hydrocracking process in producing the desired distillate products becomes very important. There is, therefore, an continuing economic advantage in providing more selective catalysts. It is an objective of the subject invention to provide a hydrocracking catalyst and process which is selective for the production of distillate boiling range hydrocarbons.

As shown by the numerous references cited above, beta zeolite is well known in the art as a component of hydrocracking catalysts. Beta zeolite is described in U.S. Pat. No. 3,308,069 and Re No. 28,341, which are incorporated herein for their description of this material. The cited references also indicate that hydrocracking conditions and procedures are widely described in the literature. A review of the relevant literature, however, reveals that apparently little has been done in the way of trying to modify the structure of Beta zeolite to optimize As performance as a component of hydrocracking catalyst or to correlate zeolite structure and acidity with selectivity. The past advances appear to be basically related to the method of catalyst preparation and to the composition of the entire catalyst particle including binder, metals, etc., rather than the zeolite itself. In comparison, the subject invention is centered around modification of the beta zeolite in a manner which improves its inherent selectivity for middle distillate products.

The subject invention centers upon modifying the physical characteristics of a beta zeolite by treating the beta zeolite. Preferably this treatment is performed exclusively by contacting the zeolite with steam at very high temperature. It has been found that different treatments result in different beta zeolite properties, and differing performance results when the treated zeolites are incorporated in hydrocracking catalysts. The treatments make numerous physical changes in the zeolite, which can be monitored by measurements of a number of characteristics, such as the relative percentage of tetrahedral aluminum in the zeolite's framework structure, unit cell size, Brönsted and Lewis acidity, percent crystallinity, surface area, macro-porosity, etc. However, it is my current hypothesis that the most important changes in relation to hydrocracking catalyst selectivity for middle distillate production are related to the relative distribution of framework tetrahedral aluminum, octahedral extra framework aluminum and so-called penta-cordinated aluminum species, all of which result in an acidity functionality. The treated beta zeolite is, therefore, believed best characterized in terms of its relative acidity site strength distribution. For instance, the acidity of the zeolite at arbitrarily selected temperatures indicated in the art to correspond to "weak", "medium" and "strong" acid sites can be measured by pyridine temperature programmed desorption and correlated versus middle distillate selectivity. The designation of acid sites as weak or strong is based upon these arbitrary measurement methods of the art and is not based upon a quantitative measurement of acid strength.

The subject catalyst is intended primarily for use as a replacement catalyst in existing commercial hydrocracking units. Its size and shape is, therefore, preferably similar to those of conventional commercial catalysts. It is preferably manufactured in the form of a cylindrical extrudate having a diameter of from about 0.8–3.2 mm (1/32–1/8 in.). The catalyst can however be made in any other desired form such as a sphere or pellet. The extrudate may be in forms other than a cylinder such as the form of a well known trilobe or other shape which has advantages in terms or reduced diffusional distance or pressure drop.

Commercial hydrocracking catalysts contain a number of non-zeolite materials. This is for several reasons such as particle strength, cost, porosity, and performance. The other catalyst components, therefore, make positive contributions to the overall catalyst even if not an active cracking component. Some traditional components such as silica-alumina normally make some contribution to the cracking capability of the catalyst. The catalyst of the subject invention contains less than 50 percent beta zeolite by weight. It is preferred that the catalyst contain a much lower amount of the beta zeolite on the order of about 0.5 to about 20 weight percent.

It is highly preferred that the catalyst contain less than 15 wt. percent zeolite. The remainder of the catalyst particle may be taken up primarily by conventional hydrocracking materials such as alumina and/or silica-alumina. The presence of silica-alumina is necessary to achieve the desired performance characteristics of the catalyst. It is important that the catalyst contains at least 25 wt. % alumina and at least 25 wt. % silica-alumina. A silica-alumina content above 40 wt. % and an alumina content above 35% is preferred. However, the alumina is believed to function only as a binder and to not be an active cracking component. The catalyst support may contain over 50 wt. % silica-alumina or over 50 wt. % alumina. Approximately equal amounts of silica-alumina and alumina are preferred. Other inorganic refractory materials which may used as a binder in addition to these materials include for example zirconia, boria, and zirconia-alumina. A zeolite content of 2–8% is acceptable.

Besides the beta zeolite and other support materials, the subject catalyst contains a metallic hydrogenation component. The hydrogenation component is preferably provided as one or more base metals uniformly distributed in the catalyst particle. Nobel metals such as platinum and palladium could be applied but best results have been obtained with a combination of two base metals. Specifically, either nickel or cobalt is paired with tungsten or molybdenum, respectively. The preferred composition of the metal hydrogenation component is both nickel and tungsten, with the amount by weight of the elemental metal of tungsten being about two to three times the amount of nickel. The amount of nickel or cobalt is preferably between about 2 and 8 weight percent of the finished catalyst. The amount of tungsten or molybdenum is preferably between about 8 and about 22 weight percent of the finished catalyst. The total amount of a base metal hydrogenation component is from about 10 to 30 wt. percent.

The catalyst of the subject process can be formulated using industry standard techniques. This can, with great generalization, be summarized as admixing the treated beta zeolite with the other inorganic oxide components and a liquid such as water or a mild acid to form an extrudable dough followed by extrusion through a multihole die plate. The extrudate is collected and preferably calcined at high temperature to harder the extrudate. The extruded particles are then screened for size and the hydrogenation components are added as by dip impregnation or the well known incipient wetness technique. If the catalyst contains two metals in the hydrogenation component these may be added sequentially or simultaneously. The catalyst particles may be calcined between metal addition steps and again after the metals are added. The finished catalyst should have a surface area between about 300 and 550 $m^2/g$ and a average bulk density (ABD) of about 0.9 to 0.96 g/cc.

The subject hydrocracking process will be operated within the general range of conditions now employed commercially in hydrocracking processes. The operating conditions in many instances are refinery or processing unit specific. That is, they are dictated in large part by the construction and limitations of the existing hydrocracking unit, which normally cannot be changed without significant expense, the composition of the feed and the desired products. The inlet temperature of the of the catalyst bed should be in the range of from about 232 to about 454° C. (450–850° F.), and the inlet pressure should be above about 10,350 kPa (1,500 psig). The feed stream is admixed with sufficient hydrogen to provide hydrogen circulation rate of about 180 to 1335 n.l/l (1000 to 7500 SCF/Bbl.) and passed into one or more reactors containing fixed beds of the catalyst. The hydrogen will be primarily derived from a recycle gas stream which may pass through purification facilities for the removal of acid gases although this is not necessary. The hydrogen rich gas admixed with the feed and any recycle hydrocarbons will preferably contain at least 90 mol percent hydrogen. For distillate hydrocracking the feed rate in terms of liquid hourly space velocity (L.H.S.V.) will normally be within the broad range of about 0.3 to 1.5 $hr^{-1}$, with a L.H.S.V. below 1.2 being preferred.

The typical feed to the subject process is a mixture of many different hydrocarbons and coboiling compounds recovered by fractional distillation from a crude petroleum. It will normally have a boiling point range starting above about 340° C. (650° F.) and ending below about 482° C. (900° F.). Such a petroleum derived feed may be a blend of streams produced in a refinery such as coker gas oil, straight run gas oil, deasphalted gas oil and vacuum gas oil. Alternatively it can be a single fraction such as a heavy vacuum gas oil. Synthetic hydrocarbon mixtures such as recovered from shale oil or coal can also be processed in the subject process. The feed may be subjected to hydrotreating or treated as by solvent extraction prior to being passed into the subject process to remove gross amounts of sulfur, nitrogen or other contaminants such as asphaltenes. The subject process is expected to convert a large portion of the feed to more volatile hydrocarbons such as naphtha and diesel boiling range hydrocarbons. Typical conversion rates vary between about 50 and 90 vol. percent depending greatly on the feed composition. The effluent of the process will actually contain a broad variety of hydrocarbons ranging from methane to essentially unchanged feed hydrocarbons boiling above the boiling range of any desired product. The hydrocarbons boiling above the boiling point of any desired product are referred to as unconverted products even if their boiling point has been reduced to some extent in the process. Most unconverted hydrocarbons are recycled to the reaction zone with a small percentage e.g. 5 vol. percent being removed as a drag stream.

The subject catalyst can be employed in what are referred to in the art as single stage and two stage process flows, with or without prior hydrotreating. These terns are used as defined and illustrated in the text *Hydrocracking Science and Technology* by J. Scherzer and A. J. Gracia, 1996, Marcel Dekker Inc., ISBN 0-8247-9760-4. In a two-stage process the subject catalyst can be employed in either the first or second stage. The catalyst may be preceded by a hydrotreating catalyst in a separate reactor or may be loaded into the same reactor as a hydrotreating catalyst or a different hydrocracking catalyst. An upstream hydrotreating catalyst can be employed as feed pretreatment step or to hydrotreat recycled unconverted materials. The hydrotreating catalyst can be employed for the specific purpose of hydrotreating poly nuclear aromatic (PNA) compounds to promote their conversion in subsequent hydrocracking catalyst bed(s). The subject catalyst can also be employed in combination with a second, different catalyst, such as a catalyst based upon Y zeolite or having primarily amorphous cracking components. It is preferred that the catalyst is employed with a feed or in a configuration that the feed passing through the catalyst is a raw feed or resembles a raw feed. The sulfur content of crude oil, and hence the feed to this process, varies greatly depending on its source. As used herein, a raw feed is intended to refer to a feed which has not been hydrotreated or which still contains organic sulfur compounds which result in a sulfur level above 1000 mol ppm.

While it is known that steaming a zeolite such as beta results in changes to the actual crystalline structure of the zeolite, the abilities of present day analytical technology have not made it possible to accurately monitor and/or characterize these changes in terms of important structural details of the zeolite. The situation is more complicated in the case of Beta zeolite as compared to Y zeolite since there are nine different tetrahedral aluminum sites in Beta zeolite but only one in Y zeolite. Instead, measurements of various physical properties of the zeolite such as surface area are used as indicators of changes which have occurred and the extend of the changes. For instance it is believed that a reduction in the zeolite's capacity to adsorb sulfur hexafluoride ($SF_6$) after being steamed is believed to be caused by a reduction in the size or accessibility of the zeolite's micropores. It is, however, an indirect correlation of the desired changes in the zeolite. X-ray diffraction data normally show a consistent loss in crystallinity caused by steaming the subject zeolite. This supports a loss of zeolite pore volume as compared to a decrease in accessibility. The percentage of aluminum in tetrahedral framework sites of the zeolite can be measured. This percentage decreases and aluminum in octahedral and other sites increases during steaming of beta zeolite according to the preferred methods set out herein. This removal of aluminum from tetrahedral framework sites is believed to be the key to toning down the activity of the Beta zeolite and allowing increased yields of distillate products.

The acidity of an aluminosilicate zeolite is normally controlled or greatly influenced by its aluminum content and the location of aluminum atoms in its structure. As the steaming moves and removes aluminum in the structure of the zeolite it influences the zeolites acidic properties. These can be monitored by numerous tests described in the literature. Many of these tests involved the adsorption/desorption of different species on the surface of the material. For instance in U.S. Pat. No. 6,268,305 the use of temperature programmed desorption of ammonia is described as being a means to monitor the relative number or arbitrarily classified weak and strong acid sites in a silicalite used in an alkylation catalyst. A preferred test to measure aluminum distribution indirectly by acidity is referred to as Pyridine IR adsorption where the IR stands for infra red. Steaming consistently causes a decrease in all types of acid sites of a Beta zeolite. The acid sites are arbitrarily classified herein as being weak, moderate and strong and relating to either Brönsted or Lewis acid sites. Pyridine is arbitrarily classified as desorbing from weak Brönsted acid sites at about 150° C., from moderate Brönsted sites at about 300° C., and from strong Brönsted sites at about 450° C.

The characterization of beta zeolite by means of temperature programmed desorption (TPD) of pyridine is described in the art. Besides the description in references sited above, the technique is described in the following: Characterization of Acid Sites in Beta and ZSM-20 Zeolites by R. B. Borade and A. Clearfield, J. Phys. Chem. 1992, 96, 6729–6737: Comparison between the surface acidity of solid catalysts determined by TPD and FTIR analysis of pre-adsorbed pyridine by E Selli and L Forni, Microporous and Mesoporous Mater. 31 (1999) 129–140: Influence of Citric Acid Treatment on the Surface Acid properties of Zeolite Beta by X. Zaiku et. al., J. Phys. Chem. B (2000) 104, 2853–2859: (discusses Lewis and Brönsted acid by pyridine IR) Specific behavior of β-zeolites upon the modification of the surface acidity by Cs and Li exchange, S. Ramirez, et. al., New J. Chem. (2000) 24(2), 99–104. These references are incorporated herein for their teaching of methods of the measuring acidity and acid distribution of zeolites by pyridine adsorption and IR studies.

Steaming a Beta zeolite under the proper conditions and for the proper time has been found to increase the selectivity of the Beta zeolites cracking capacity for distillate hydrocarbons. That is, it tends to reduce the tendency of the Beta zeolite to overcrack the feedstock and produce large amounts of $C_4$ minus hydrocarbons. There is, however, an apparent tradeoff between overall distillate yield and activity that must be considered. This is a limit to the improvement which appears to be obtainable by steaming the zeolite.

Steaming of the Beta zeolite can be performed successfully in different ways, with the method which is actually employed commercially often being greatly influenced and perhaps dictated by the type and capability of the available equipment. Steaming can be performed with the zeolite retained as a fixed mass or with the zeolite being conveyed by means of a belt or being agitated in a rotating kiln. The important factors are uniform treatment of all zeolite particles under appropriate conditions of time, temperature and steam concentration. For instance, the zeolite should not be placed such that there is a significant difference in the amount of steam contacting the surface and the interior of the zeolite mass. It is preferred that the Beta zeolite is steam treated in an atmosphere having live steam passing through the equipment providing high steam concentration. This may be described as being at a steam concentration of at least 50 mol %. Steam concentrations may range from 75 to 100 mol %, with small scale laboratory operations extending toward higher concentrations. The steaming is preferably performed for 1 to 4 hours at a temperature of from about 750° C. to about 925° C. at atmospheric pressure. Temperatures above this range appear to damage the zeolite. Temperatures below this range appear ineffective. A steaming temperature of about 800° C. is highly preferred. It is taught in the art that there is normally an interplay between time and temperature of steaming, with an increase in temperature reducing the required time. Nevertheless, for good results it appears a time period of about 1 to 1½ hours is highly preferred. The preferred method of performing steaming on a commercial scale is by means of a rotary kiln having steam injected at a rate which maintains an atmosphere of about 80% steam.

The beta zeolite of the subject invention is not treated with an acid solution to effect dealumination. In this regard it is noted that essentially all raw (as synthesized) zeolite is exposed to an acid to reduce the concentration of sodium which remains from synthesis. This step in the zeolite manufacture procedure is not considered part of the treatment of manufactured zeolite as described herein. During the treatment and catalyst manufacturing procedures the zeolite is preferably only exposed to an acid during incidental manufacturing activities such as peptization during forming or during metals impregnation. The zeolite is preferably not acid washed after the steaming procedure as to remove aluminum "debris" from the pores.

An exemplary lab scale steaming procedure is performed with the zeolite held in a 6.4 cm (2-½ inch) quartz tube in a clam shell furnace. The temperature of the furnace is slowly ramped up by a controller. After the temperature of zeolite reaches 150° C. steam generated from deionized water held in a flask is allowed to enter the bottom of the quartz tube and pass upward. No other gas is passed into the tube. The flask is refilled as needed. In the exemplary procedure the time between cutting in the steam and the zeolite reaching 800° C. was about one hour. At the end of the set steam period the temperature in the furnace is reduced by resetting the controller to 20° C. the furnace is allowed to cool to 400° C. (about 2 hours) and the flow of steam into the quartz tube is stopped. The sample is removed at 100° C. and placed in a lab oven held overnight at 110° C. with an air purge.

The beta zeolite of the subject invention may also be characterized in terms of $SF_6$ adsorption. This is a recognized technique for the characterization of microporous materials such as zeolites. It is similar to other adsorption capacity measurements, such as water capacity, in that it uses weight differences to measure the amount of $SF_6$ which is adsorbed by a sample which has been pretreated to be substantially free of the adsorbate. $SF_6$ is used in this test since because of its size and shape hinders its entrance into pores having a diameter of less than about 6 angstroms. It thus can be used as one measurement of available pore mouth and pore diameter shrinkage. This in turn is a measurement of the effect of steaming on the zeolite. In a simplistic description of this method, the sample is preferably predried in a vacuum at (350° C.) and weighed. It is then exposed to the $SF_6$ for one hour while the sample is maintained at a temperature of 20° C. The vapor pressure of the $SF_6$ is maintained at that provided by liquid $SF_6$ at 400 Torr. The sample is again weighed to measure the amount of adsorbed $SF_6$. The sample may be suspended on a scale during these steps to facilitate these steps.

The relative performance of catalysts containing beta zeolite subjected to various degrees of treatment by high temperature steaming was measured by pilot plant scale testing using a blended hydrotreated feed having the composition set out in Table 1. The catalysts contained approximately 10 wt percent beta zeolite. The other components of the catalyst support were equal weight percentages of silica-alumina and alumina. The three component support was then wet impregnated by standard techniques to contain about 5.4 wt. % nickel and 17.8 wt. % tungsten as the hydrogenation component. The catalysts were presulfided and subjected to a high space velocity in-use aging procedure prior to testing to ensure the test operation was free of startup artifacts. The temperature of the reaction zone during the test was controlled to result in the production of a 44° API collected liquid product at a LHSV of 1.5 $hr^{-1}$. The reaction zone was operated at a pressure of 14,479 kPa with hydrogen being circulated at a rate of 6667 scfb. Analytical results were obtained for the beta zeolite powder used in the formulation of the tested catalysts. Conversion during the testing periods varied between 63 and 77 vol. %. Conversion was defined to be the yield of hydrocarbons boiling below 700° F. resulting from cracking of feed boiling above 700° F.

TABLE 1

Feed Properties

| | |
|---|---|
| Density, g/cc | 0.867 |
| Gravity, API | 31.72 |
| Sulfur, wt. % | 1.89 |
| Nitrogen, wppm | 569 |
| Distillation, ° C. | Sim Dist |
| IBP/5 wt % | 159/226 |
| 10/20 | 321/366 |
| 30/40 | 384/403 |
| 50/60 | 418/433 |
| 70/80 | 449/468 |
| 90/95 | 491/512 |
| EBP | 553 |

Figure 2:
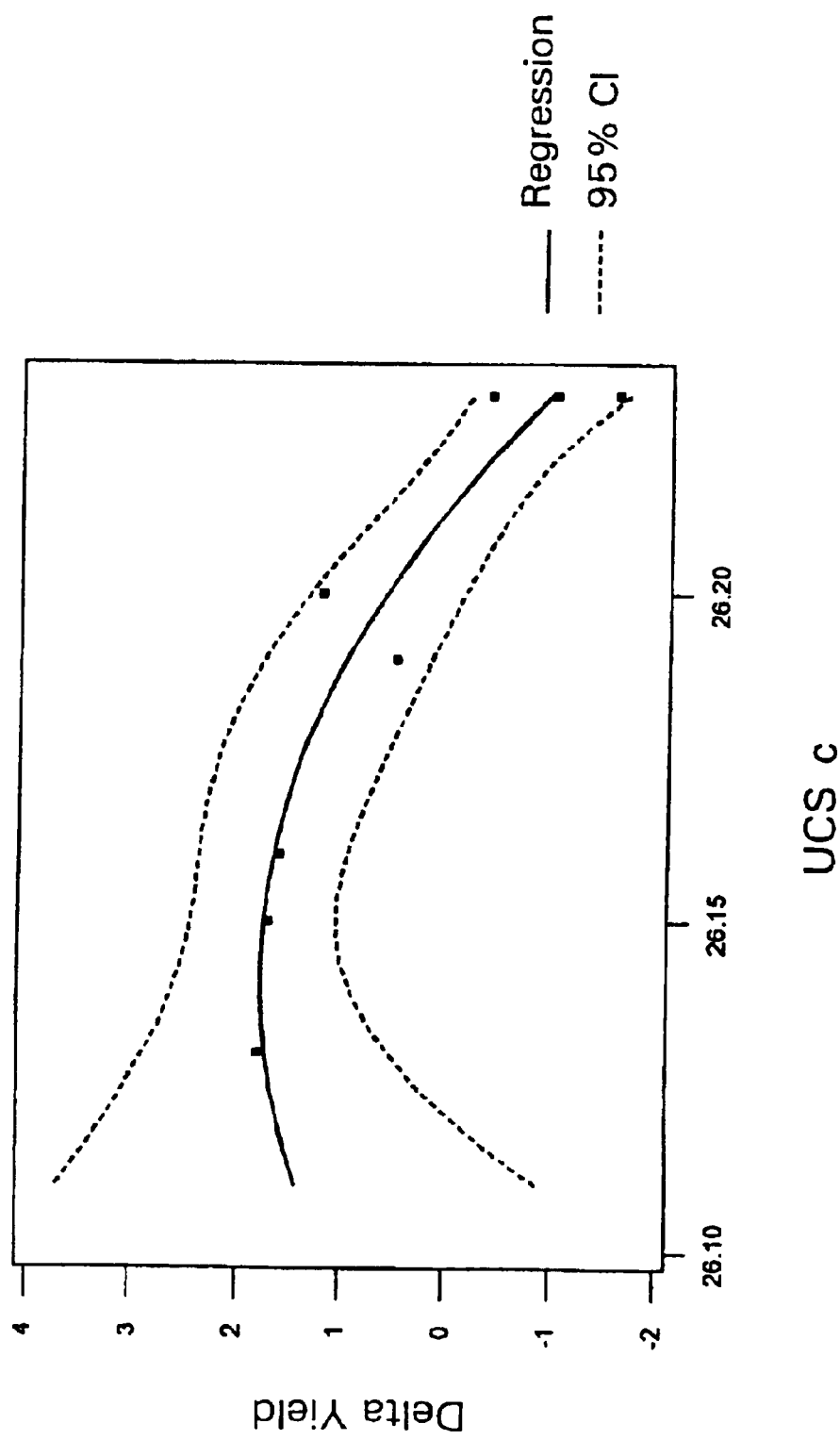
FIG. 2 is a chart of the yield advantage of tested catalysts compared is to a reference catalyst plotted versus the unit cell size of the zeolite used in the catalysts.
Figure 3:
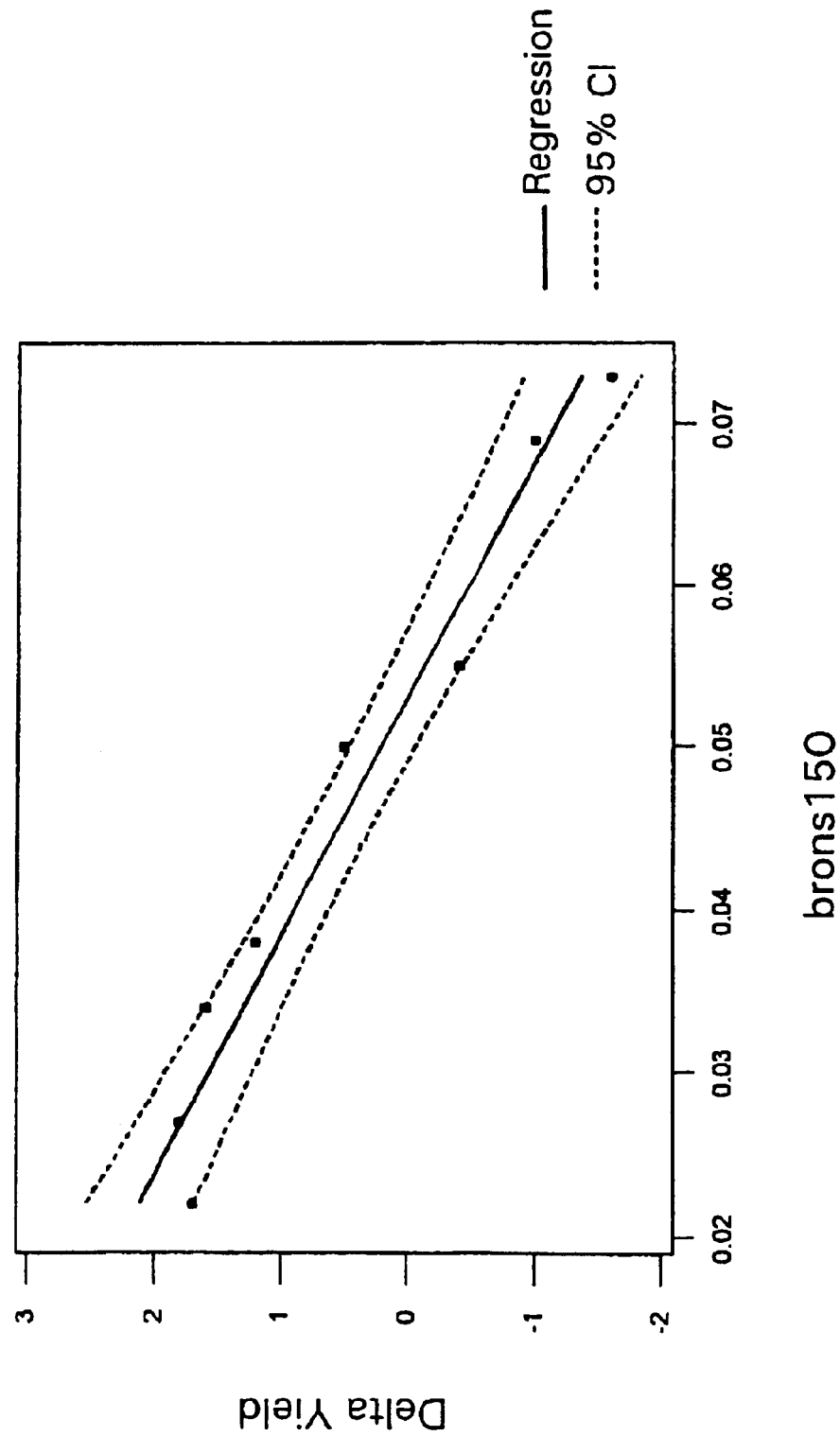
FIG. 3 is a chart of the yield advantage of tested catalysts versus Brönsted acidity pyridine adsorption value (Au/mg) at 150° C. of the zeolite in the catalysts.
Figure 4:
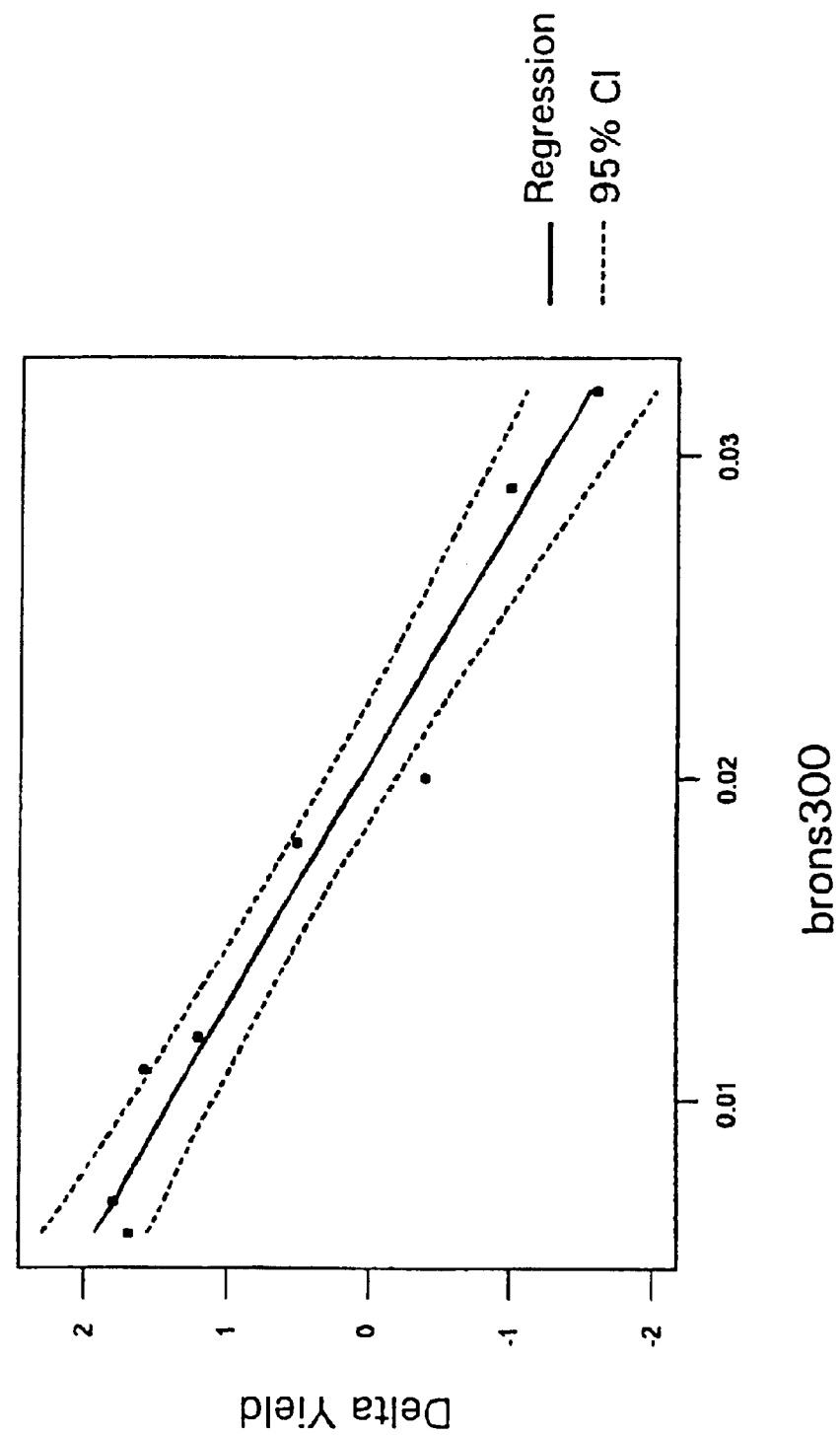
FIG. 4 is a chart of the yield advantage of tested catalysts compared to a reference catalyst at Brönsted pyridine adsorption value measurements of acidity at 300° C.
Figure 5:
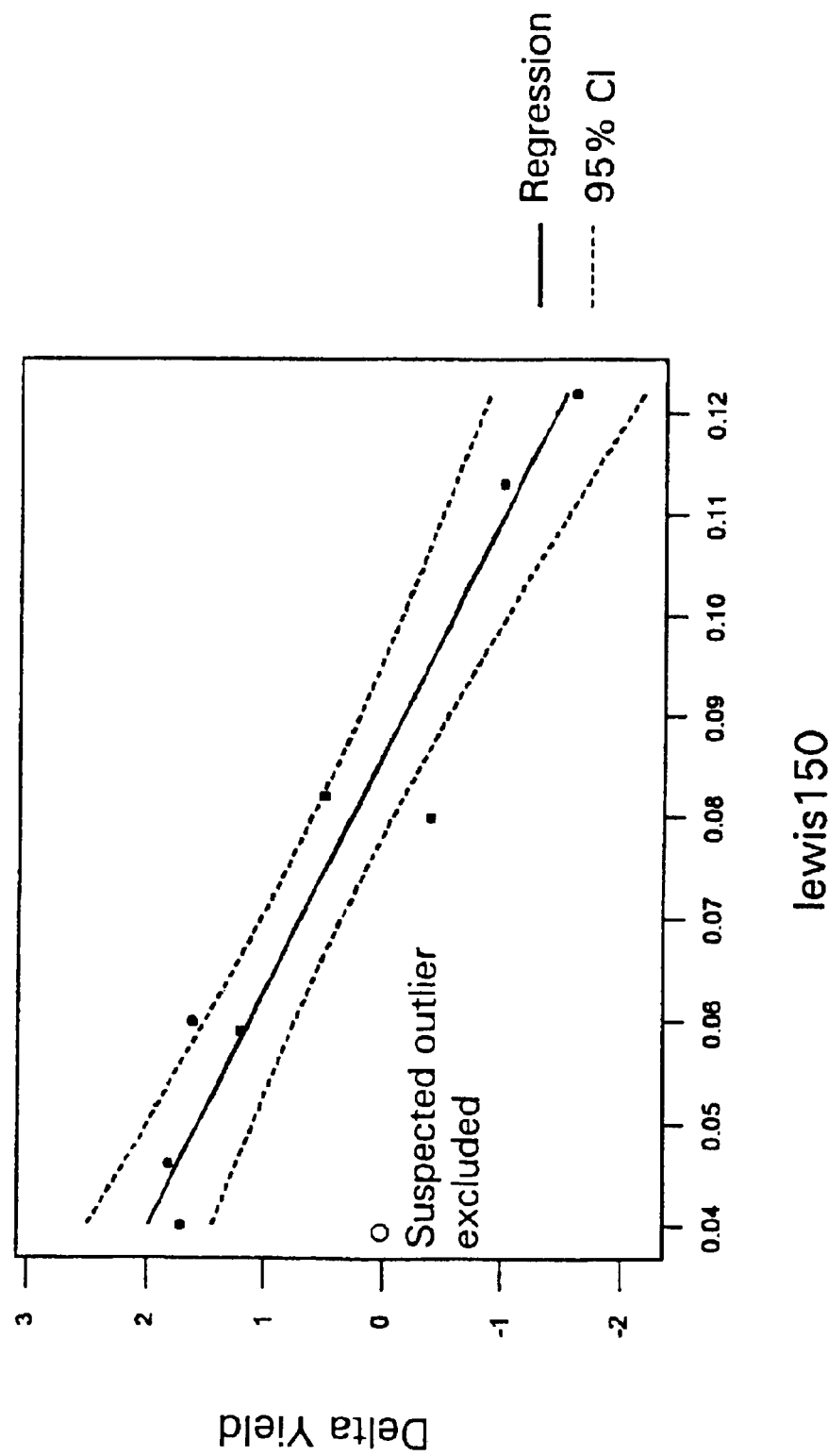
FIG. 5 is a chart of the yield advantage of tested catalysts versus a reference catalyst at various Lewis 150° C. pyridine adsorption value measurements at 150° C.
Figure 6:
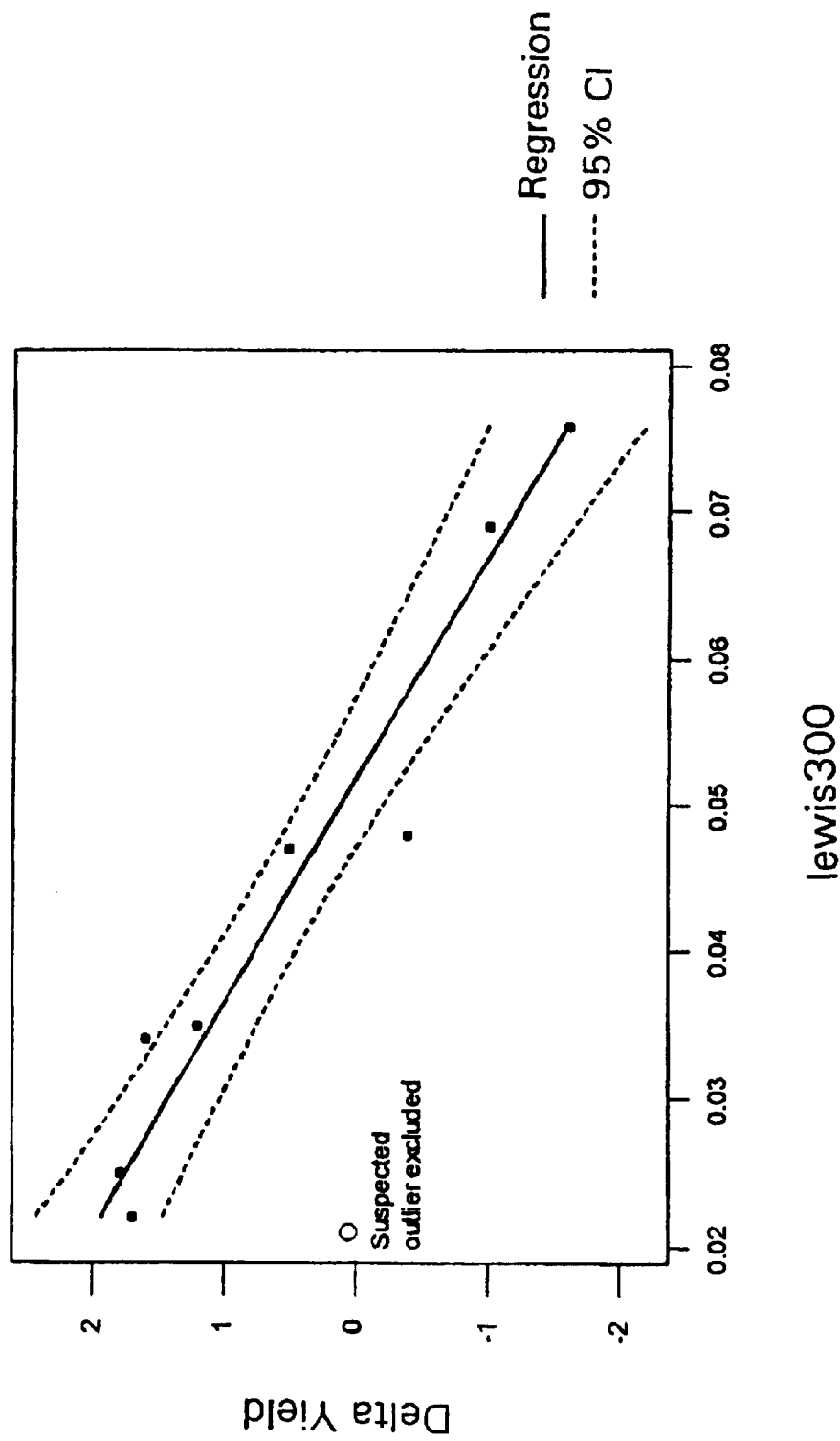
FIG. 6 is a chart of the yield advantage of tested catalysts versus a reference catalyst at various Lewis acidity pyridine adsorption measurements at 300° C.
Figure 7:
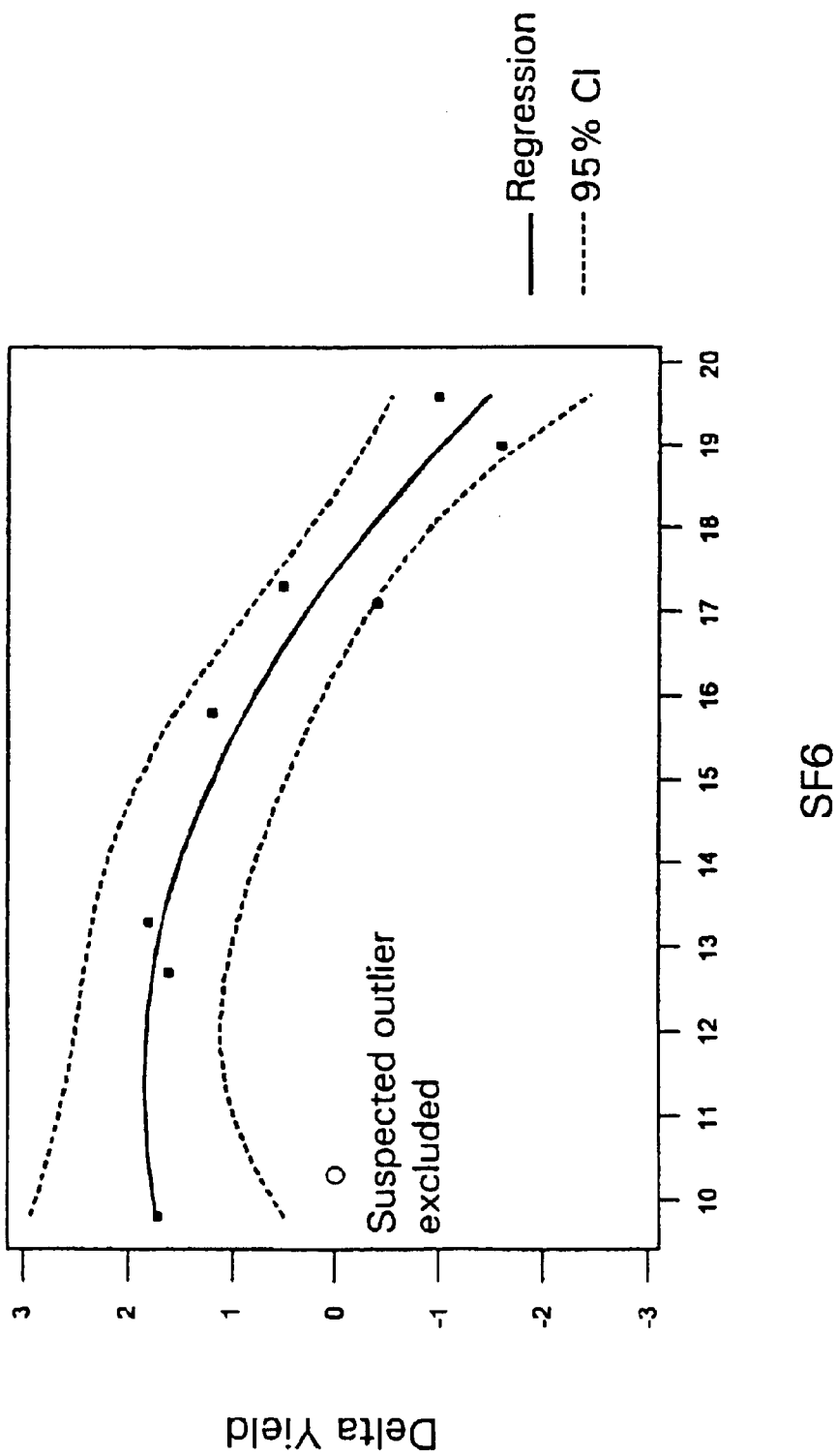
FIG. 7 is a chart of the yield advantage of tested catalysts compared to a reference catalyst at differing zeolite $SF_6$ adsorption capacities.
Figure 8:
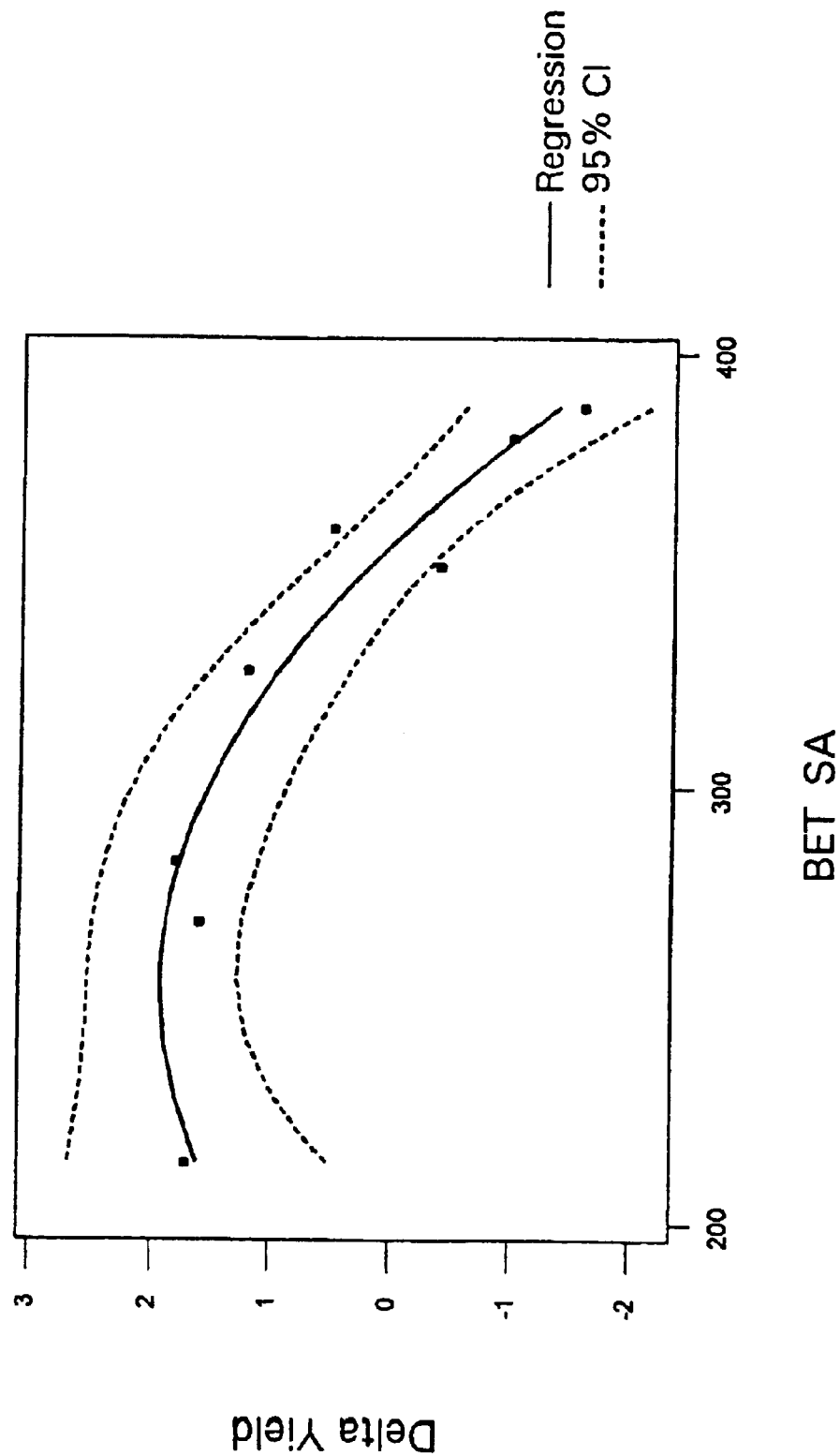
FIG. 8 is a chart of the yield advantage of tested catalysts compared to a reference catalyst plotted versus the BET surface area of the zeolite used in the catalysts.

The data found in zeolite analytical tests of the zeolite powder was correlated against the selectivity and activity data generated in the pilot plant tests. Selectivity is based upon wt. percent of collected hydrocarbons having boiling points between 149–371° C. (300 and 700° F.). Many correlations were derived for physical characteristics including Brönsted acidity at 150, 300 and 450° C. and Lewis acidity at 150, 300, and 450° C. by pyridine IR, the percent aluminum in tetrahedral framework sites measured by aluminum NMR, x-ray diffraction intensity, BET surface area, $SF_6$ adsorption capacity and water adsorption capacity at 4.6 torr by McBain balance, unit cell size and pore volume (nitrogen). The best correlations in terms of statistically fit are presented in FIGS. 1–8. The straight line is a linear regression of the analytical values of individual zeolites as shown by the dots. The dotted lines represent 95 percent confidence levels (CL). The best correlation was for Brönsted acidity at 150° C. followed by tetrahedral aluminum and XRD intensity.

Based upon the data provided by the tests it appears that the catalyst should contain a beta zeolite having a unit cell size parameter "c" between about 26.10 to about 26.20 and have less than about 17 percent of the framework aluminum characterized by NMR as tetrahedral aluminum. The range of the number of observed tetrahedral aluminum in the zeolite framework of the treated beta zeolite can range from about 10 to about 15%. It is preferred that the treated beta zeolite has a Brönsted 150° C. acidity value less than about 0.05 Au/mg, and more preferably between 0.02 and about 0.05. Further, it is preferred that the treated beta zeolite has a Lewis pyridine adsorption value at 150° C. between about 0.04 and 0.08 Au/mg. It is further preferred that the Brönsted pyridine adsorption value at 300° C. of the treated zeolite is less than 0.02 Au/mg and preferably between about 0.008 and about 0.02. The Brönsted pyridine IR adsorption value of the zeolite at 450° C. is preferably less than 0.005 Au/mg. The Lewis 300° C. acidity of the treated zeolite should be less than about 0.05 Au/mg and is preferably between 0.02 and 0.05 Au/mg. Finally, the $SF_6$ adsorption capacity of the treated beta zeolite should be below about 17 wt. %, and is preferably between about 9 and 16 wt. %.

Steaming tends to reduce all forms of acidity. However, the effect on different acidity strengths and types does vary. In general it has been found that distillate yield or selectivity of a beta zeolite based hydrocracking catalyst increases with an decrease in the number of weak and moderate Lewis acid sites, with an decrease in the number of weak Brönsted acid sites, and shows an optimum versus $SF_6$ capacity. An increase in distillate yield was also found to correlate with a decrease in the number of moderate Brönsted acid sites and a decrease in BET surface area. Statistical techniques showed that the strongest correlations are with the number of weak Brönsted acid sites followed by the number of medium Brönsted acid sites. Viewed from the perspective of correlating physical characteristics with activity, as measured by the temperature needed to convert a set percentage of a feed, it is desired to increase the number of tetrahedral aluminum sites, to increase the SF6 adsorption capacity of the zeolite and to increase its X-ray diffraction relative intensity. Increased activity also correlated with a decrease in the number of weak Brönsted acid sites. There is, of course, a trade off between activity and selectivity.

The treated beta zeolite preferably has a BET surface area between about 220 and 325 $m^2/gm$. The term BET surface area refers to surface area measurements performed using the well-know Brunauer-Emmett-Teller method as described in the article by S. Brunauer, P. Emmett and E. Teller, J. Am. Chem. Soc. 60, 309, (1938) using nitrogen as the adsorbate.

The measurement of the acidity of zeolites including Beta zeolite is well documented in the literature. It is described, for instance, in the article Characterization of Beta/MCM-41 composite molecular sieve compared with mechanical mixture by W. Guo, L. Huang, P. Deng, Z. Xue and Q. Li, in Microporous and Mesoporous Materials 44–45 (2001) 427–434. This reference presents measurements of Lewis and Brönsted acidity determined at three temperatures. Measurements of pyridine adsorption using infrared range spectrum adsorption allows the differentiation between Lewis and Brönsted acid sites.

Much of the available literature reports actual amounts of adsorbed pyridine. This requires precise weight measurements done in a manner which prohibits the adsorption or desorption of pyridine from the sample. These steps are believed to introduce a potential for error and are time consuming. Therefore, pyridine adsorption was only measured indirectly by spectral analysis. This results in the "adsorption" of pyridine being reported in terms of atomic units (Au) rather than mg of adsorbed pyridine.

In a preferred form of the infrared pyridine adsorption measurement the zeolite is pressed at 5000 psig to form a 13 mm. self-supporting pellet. The sample is then heated to 500° C. in a flow of 20% oxygen in nitrogen for one hour. Pyridine was allowed to adsorb onto the pellet for one hour at 150° C. The pyridine is from helium saturated at 7° C. with pyridine. The pyridine adsorbs onto both the Brönsted and Lewis acid sites. The pellet is then cooled to 20° C. and a background spectrum is acquired using a Nicolet Magna 550 infrared spectrometer at 2 $cm^{-1}$ resolution using a cooled MCT detector. The sample is then heated to the desired sampling temperature e.g. 300° C. and held at this temperature for one hour. A second spectrum is then acquired, and the difference between the second spectrum and the background spectrum is determined. The area of the peaks at 1550 $cm^{-1}$ (Brönsted) and 1455 $cm^{-1}$ (Lewis) acid sites is determined and recorded. This provides a measure of the relative amount of each site on the sample.

Steaming at 800° C. for two hours produces a dramatic decrease in the acidity measurements. For instance, the 300° C. Brönsted measurement drops from 0.303 to 0.016 Au/mg and the 450° C. Brönsted value is 0.001 Au/mg. Steaming at 800° C. for three hours reduces the total number of measured Brönsted sites by 90%. The moderate (300° C.) sites are reduced by 95% and the strong (450° C.) adsorption sites are essentially eliminated (less than 2% remaining).

The measurement of relative acidities via TPD also allows for measurement of what can be termed total acidity, based upon adsorption of specified adsorbate. A representative catalyst of the subject invention has a total Brönsted and Lewis acidity as measured by this pyridine adsorption technique at 150° C. of about 0.11 Au/mg.

In any mass production procedure involving techniques such as steaming and heating there is a possibility for individual particles to be subjected to differing levels of treatment. For instance, particles on the bottom of a pile moving along a belt may not be subjected to the same atmosphere or temperature as the particles which cover the top of the pile. This factor must be considered during manufacturing and also during analysis and testing of the finished product. It is, therefore, recommended that any test measure done on the catalyst is performed on a number of randomly obtained individual pellets to avoid being misled by measurements which performed simultaneously on several particles. For instance, an adsorption capacity measurement made using several pellets reports the average adsorption of all the pellets and does not indicate whether individual particles match adsorption criteria. The average adsorption value could be within specification while the individual particles are not within the specification.

One process embodiment of the invention may accordingly be characterized as a hydrocracking process which comprises contacting a feed stream comprising hydrocarbons having boiling points between about 340° C. and about 540° C. with a catalyst comprising at least 40 wt. % silica-alumina and from 0.5 to about 20 wt. % beta zeolite as active cracking components, which beta zeolite has been treated by steaming at temperatures between about 750 and 925° C. and which beta zeolite is further characterized by a unit cell size parameter "c" value of 26.10 to 26.20, the beta zeolite having between 1 to 15 percent tetrahedral aluminum by NMR and an acidity distribution characterized by Brönsted pyridine IR adsorption values of less than 0.05 mg/cc at 156° C. and less than 0.02 mg/cc at 300° C., a Brönsted pyridine IR adsorption value at 450° C. of less than 0.005 Au/mg and less than 2% of the value of the corresponding untreated beta zeolite.

What is claimed:

1. A hydrocracking process which comprises contacting a feed stream comprising hydrocarbons having boiling points between about 340° C. and about 540° C. with a catalyst comprising a hydrogenation component and beta zeolite, which beta zeolite has been treated to increase its selectivity to the production of middle distillate products and which beta zeolite is further characterized by a unit cell size parameter "c" value of 26.10 to 26.20 and a positive amount less than 17 percent of total aluminum as tetrahedral aluminum as determined by NMR.

2. The process of claim 1 further characterized in that the beta zeolite has a Brönsted pyridine adsorption value at 150° C. of less than about 0.05 Au/mg.

3. The process of claim 1 wherein the beta zeolite has a Brönsted pyridine adsorption value at 300° C. of less than about 0.02 Au/mg.

4. The process of claim 1 further limited in that the percentage of tetrahedral aluminum in the beta zeolite structure is between 10 and 15 percent.

5. The process of claim 4 further characterized in that the beta zeolite has a Brönsted 150° C. acidity value of 0.02 to 0.05 and a Lewis 150° C. acidity value of 0.04 to 0.08.

6. The process of claim 4 further characterized in that the catalyst contains a positive amount less than 15 wt. % beta zeolite and at least 25 wt. % silica alumina.

7. The process of claim 6 further characterized in that the catalyst contains at least 25 wt. % alumina.

8. A hydrocracking process which comprises contacting a feed stream comprising hydrocarbons having boiling points between about 340° C. and about 540° C. with a catalyst comprising silica-alumina and beta zeolite as active cracking components, which beta zeolite has been treated by steaming at temperatures between about 750 and 925° C. and which beta zeolite is further characterized by a unit cell size parameter "c" value of 26.10 to 26.20, the beta zeolite having between 10 to 15 percent tetrahedral aluminum by NMR and an acidity distribution characterized by Brönsted pyridine IR adsorption values of less than 0.05 mg/cc at 150° C. and less than 0.02 mg/cc at 300° C.

9. The process of claim 8 further characterize in that the Brönsted pyridine IR adsorption value of the beta zeolite is reduced by at least 90% during the treatment by steaming at a temperature between 750 and 925° C.

10. The process of claim 8 further characterized in that the beta zeolite has a Brönsted pyridine adsorption value at 300° C. of less than 0.02 Au/mg.

11. The process of claim 8 further characterized in that the beta zeolite bas a Brönsted pyridine adsorption value at 450°

C. of less than 0.005 Au/mg and a Lewis pyridine adsorption value at 150° C. of 0.04 to 0.08 Au/mg.

12. The process of claim 8 further characterized in that the catalyst contains less than 15 wt. % beta zeolite and at least 40 wt. % silica alumina.

13. The process of claim 12 further characterized in that the catalyst contains at least 35 wt. % alumina.

14. The process of claim 13 further characterized in that the Brönsted pyridine IR adsorption value of the beta zeolite at 450° C. is less than 0.005 Au/mg and less than 2% of the value of the corresponding untreated beta zeolite.

15. A hydrocracking process which comprises contacting a feed stream comprising hydrocarbons having boiling points between about 340° C. and about 540° C. with a catalyst comprising at least 40 wt. % silica-alumina and from 0.5 to about 20 wt. % beta zeolite as active cracking components, which beta zeolite has been treated by steaming at temperatures between about 750 and 925° C. and which beta zeolite is further characterized by a unit cell size parameter "c" value of 26.10 to 26.20, the beta zeolite having between 1 to 15 percent tetrahedral aluminum by NMR and an acidity distribution characterized by Brönsted pyridine IR adsorption values of less than 0.05 mg/cc at 150° C. and less than 0.02 mg/cc at 300° C., a Brönsted pyridine IR adsorption value of at 450° C. of less than 0.005 Au/mg and less than 2% of the value of the corresponding untreated beta zeolite.

* * * * *